C. W. & J. D. WILCOX.
Carriage-Pole Socket.
No. 102,456.  Patented April 26, 1870.
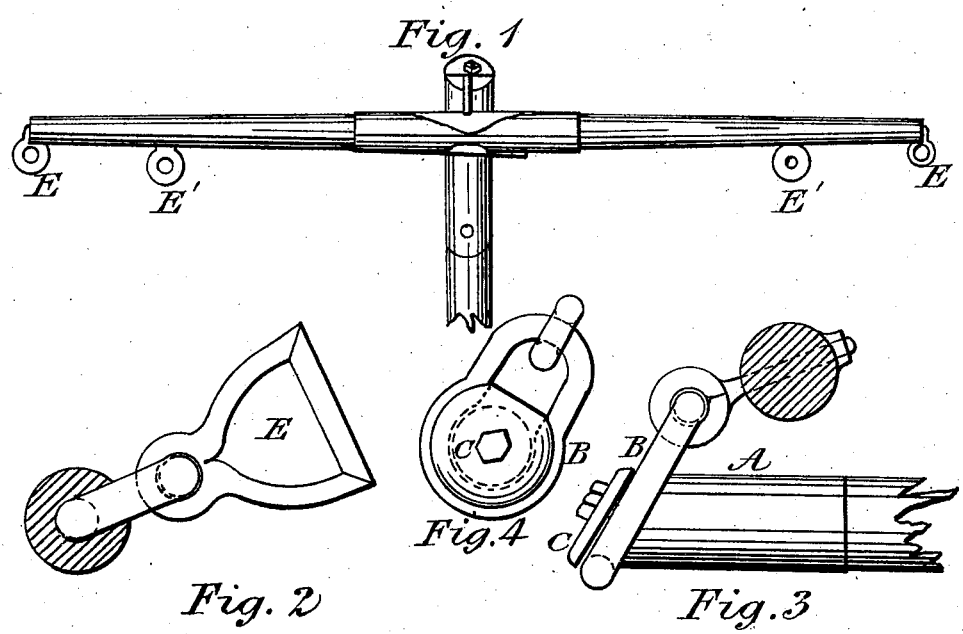

United States Patent Office.

CHARLES W. WILCOX AND JOSEPH D. WILCOX, OF KINGSTON, RHODE ISLAND.

Letters Patent No. 102,456, dated April 26, 1870.

IMPROVED POLE-SOCKET.

The Schedule referred to in these Letters Patent and making part of the same.

*To all whom it may concern:*

Be it known that we, CHARLES W. WILCOX and JOSEPH D. WILCOX, both of Kingston, in the county of Washington and State of Rhode Island, have invented a new and improved "Neck-Yoke and Pole-Socket"; and we do hereby declare that the following specification, taken in connection with the drawings making a part of the same, is a full, clear, and exact description thereof.

Figures 1, 3, and 4 show the yoke and socket in combination.

Figure 2 shows the manner of attaching the ring or stirrup.

Our invention relates to the manner of attaching the neck-yoke to the pole and to the harness, and consists in certain improvements in the construction of the same, as hereinafter described.

Ordinary neck-yokes now in use are usually attached to the pole a short distance from the end, so that, not unfrequently, the horses in tossing their heads, as they are apt to do when at work, catch the reins over this projecting end of the pole and render a stop necessary, until the driver can dismount from his seat, pass to the front of the horses, undo it, and return.

This most disadvantageously occurs in the trial of mowing or other machines where a few moments time is often of much consequence.

This difficulty is also repeated in another way, as the ring or stirrup in the neck-yoke through which the holding-strap passes is also usually attached a short distance from the end of the same, and furnishes another catching place for the reins.

In our invention we seek to overcome these defects, and at the same time to add other improvements which will materially enhance the value of the manufactured article, as we will now proceed to describe.

We attach the neck-yoke to the extreme end of the pole, as shown in figs. 1, 3, and 4, and for this purpose provide the said pole with a socket, A, having upon its end a shoulder, as shown in fig. 3.

The ring B, which is attached to the yoke, is slipped upon the end of the socket, and rests against the said shoulder, after which the cap or end piece C, as shown in figs. 3 and 4, is placed upon the end of the socket and secured by a nut and the ring B, thus prevented from slipping off.

By this improvement the reins are not only prevented from catching, but the neck-yoke itself remains upon the pole after the horses are detached and is not left upon the ground to be thrown about or lost.

We also make use of two rings or stirrups $e\ e'$ upon each end of the yoke, instead of one, through both of which the holding-strap passes. The reins are prevented from catching upon the yoke by having the outer ring or stirrups E E' attached to the extreme ends of the same, and a double number is used, not only to give increased strength to the yoke, but to materially lessen the wear and strain upon the straps, the breaking of which is not only often a matter of serious inconvenience, but of some considerable expense.

What we claim as our invention, and desire to secure by Letters Patent, is—

The pole-socket A, constructed with a shoulder and cap or end piece C, the whole constructed and arranged substantially as described for the purpose of holding the yoke to the pole.

CHARLES W. WILCOX.
JOSEPH D. WILCOX.

Witnesses:
HENRY T. BRAMAN,
J. G. PERRY.